United States Patent [19]

Fujiki

[11] Patent Number: 5,504,176

[45] Date of Patent: Apr. 2, 1996

[54] SILICONE RUBBER COMPOSITION

[75] Inventor: Hironao Fujiki, Takasaki, Japan

[73] Assignee: Shin-Etsu Chemical Co., Ltd., Tokyo, Japan

[21] Appl. No.: 224,971

[22] Filed: Apr. 8, 1994

[30] Foreign Application Priority Data

Apr. 23, 1993 [JP] Japan ................. 5-120786

[51] Int. Cl.$^6$ ................................ C08G 77/06
[52] U.S. Cl. ................. 528/18; 528/33; 528/34
[58] Field of Search ................. 528/18, 33, 34

[56] References Cited

U.S. PATENT DOCUMENTS

| | | | |
|---|---|---|---|
| 2,843,555 | 7/1958 | Berridge | 528/17 |
| 3,070,566 | 12/1962 | Nitzsche et al. | 528/18 |
| 3,133,891 | 5/1964 | Ceyzeriat | 528/18 |
| 3,186,963 | 6/1965 | Lewis et al. | 528/18 |
| 4,166,053 | 8/1979 | Bossert et al. | 528/18 |
| 4,362,566 | 12/1982 | Hinterwaldner | 524/6 |
| 4,461,854 | 7/1984 | Smith . | |
| 4,755,579 | 7/1988 | Letoffe | 528/18 |
| 4,784,879 | 11/1988 | Lee et al. . | |
| 5,180,771 | 1/1993 | Arai et al. | 528/18 |

FOREIGN PATENT DOCUMENTS

| | | |
|---|---|---|
| 0363006 | 4/1990 | European Pat. Off. . |
| 0473269 | 3/1992 | European Pat. Off. . |
| 53-41707 | 11/1978 | Japan . |

*Primary Examiner*—Melvyn I. Marquis
*Attorney, Agent, or Firm*—Birch, Stewart, Kolasch & Birch

[57] ABSTRACT

A silicone rubber composition comprising (1) a diorganopolysiloxane blocked with a hydroxysilyl group at either end, (2) a silane or siloxane having at least three hydrolyzable silyl groups in a molecule, and (3) a divalent organic tin compound in a form substantially isolated from air quickly cures into a silicone rubber elastomer simply by heating at 40° to 200° C.

8 Claims, No Drawings

SILICONE RUBBER COMPOSITION

BACKGROUND OF THE INVENTION

1. Field of the Invention

This invention relates to a silicone rubber composition which quickly cures into a silicone rubber elastomer having excellent rubbery properties.

2. Prior Art

Prior art room temperature vulcanizable (RTV) silicone rubber compositions of the condensation type are generally based on a diorganopolysiloxane end-blocked with a hydrolyzable silyl group or based on a diorganopolysiloxane blocked with a hydroxysilyl group at either end and a silane or siloxane having at least three hydrolyzable silyl groups in a molecule. They are cured with the aid of curing catalysts such as tetravalent organic tin compounds and organic titanium compounds.

Among these, the former silicone rubber compositions based on a diorganopolysiloxane end-blocked with a hydrolyzable silyl group do not cure without water or humidity and are not expectable to promote curing by heating. It was difficult to cure these compositions within a short time. The latter silicone rubber compositions based on a diorganopolysiloxane blocked with a hydroxysilyl group at either end and a silane or siloxane having at least three hydrolyzable silyl groups in a molecule cure fast and are less affected by water as compared with the former compositions. However, water supply is indispensable in order to allow heavy-gage moldings of these compositions to cure to the deep inside. To this end, water, alcohol or the like is added to the compositions. Even when such a technique is employed, large sized moldings require an undesirably long time until curing is completed.

One known heat curing type of liquid silicone rubber composition is a composition of the addition curing type relying on hydroxysilylation reaction. The liquid silicone rubber compositions of heat curing type are advantageous in that the curing rate is increased by heating and the pot life is readily adjustable, but have a disadvantage associated with the use of platinum series compounds as the catalyst. When contacted with compounds having an ability to coordinate with a platinum series metal, for example, compounds or materials containing sulfur, amine or tin, the compositions are inhibited from curing due to catalyst poisoning. Therefore, the compositions are applicable only under limited conditions.

SUMMARY OF THE INVENTION

Therefore, an object of the present invention is to provide a novel and improved silicone rubber composition which quickly cures to the deep inside simply by heating, without cure inhibition, to form a silicone rubber elastomer having excellent rubbery properties and a method for curing the composition.

We have found that when a diorganopolysiloxane blocked with a hydroxysilyl group at either end, a silane or siloxane having at least three hydrolyzable silyl groups in a molecule, and a divalent organic tin compound in a form substantially isolated from air are blended, there is obtained a silicone rubber composition which upon heating, is quickly curable into a silicone rubber elastomer having excellent rubbery properties without being inhibited from curing.

More particularly, we have found that unlike the tetravalent organic tin compounds commonly used as a condensation curing catalyst in the prior art, divalent organic tin compounds used as a curing catalyst allow a silicone rubber composition comprising a diorganopolysiloxane blocked with a hydroxysilyl group at either end and a silane or siloxane having at least three hydrolyzable silyl groups in a molecule to quickly cure to the deep inside simply by heating at a temperature of about 40° to 200° C. and without a need for water, producing a useful silicone rubber elastomer. The resulting silicone rubber elastomer or cured product has excellent rubbery properties since depolymerization or cracking of siloxane under high temperature enclosure is minimized as compared with the use of tetravalent organic tin catalysts. Although the silicone rubber composition having the divalent organic tin compound blended therein has a serious problem that even when it is divided in two separate packages for storage, it ceases to cure after several days or a few months, we have found that shelf stability is significantly improved by substantially isolating the divalent organic tin compound from air. This, coupled with freedom from cure inhibition by catalyst poison, allows the silicone rubber composition to find a wider variety of applications. The present invention is predicated on these findings.

Briefly stated, the present invention provides a silicone rubber composition comprising (1) a diorganopolysiloxane blocked with a hydroxysilyl group at either end, (2) a silane or siloxane having at least three hydrolyzable silyl groups in a molecule, and (3) a divalent organic tin compound in a form substantially isolated from air. This composition is heat curable into a silicone rubber elastomer.

Also contemplated herein is a method for curing a silicone rubber composition as defined above by heating the composition at a temperature of about 40° to about 200° C.

DETAILED DESCRIPTION OF THE INVENTION

A first component of the silicone rubber composition according to the present invention is a diorganopolysiloxane blocked with a hydroxysilyl group at either end.

Preferred are diorganopolysiloxanes of the following general formula (1).

In formula (1), R is a substituted or unsubstituted monovalent hydrocarbon group having 1 to 10 carbon atoms, for example, methyl, ethyl, propyl, phenyl, vinyl and trifluoropropyl groups. If necessary, some R groups may have a hydroxysilyl substituent. Letter n is an integer of 100 to 1,000.

The diorganopolysiloxanes of formula (1) preferably have a viscosity of 100 to 100,000 centistokes at 25° C. They are generally synthesized by effecting equilibration reaction of organocyclopolysiloxanes in the presence of an alkali or acid catalyst using water or a silanol group-containing low molecular weight compound as a reaction stopper. Exemplary alkali catalysts are potassium hydroxide, tetraalkylphosphonium hydroxide, and tetraalkylammonium hydroxide and exemplary acid catalysts are sulfuric acid, methanesulfonic acid and trifluoromethanesulfonic acid.

A second component is a silane or siloxane having at least three hydrolyzable silyl groups in a molecule. Since it serves as a cross-linking agent, it must contain in a molecule at least three hydrolyzable functional groups capable of reacting with silanol groups in the diorganopolysiloxane of formula (1) to form an elastomer.

The silane or siloxane of the second component may be represented by the following general formula:

$$R^1_a R^2_b SiO_{(4-a-b)/2}$$

wherein $0.1<a\leq 4$ and $2<a+b\leq 4$.

In the formula, $R^1$ is an unsubstituted or substituted monovalent hydrocarbon group having 1 to 10 carbon atoms such as an alkyl group including methyl, ethyl, propyl, isopropyl, butyl and isobutyl, an alkenyl group including vinyl, allyl and propenyl, an aryl group including phenyl, and a substituted one in which some or all of hydrogen atoms in the above hydrocarbon groups are replaced by a halogen atom or a cyano group. $R^2$ is a hydrolyzable functional group.

The hydrolyzable functional groups used herein include acyloxy, ketoximito, amino, amido, acid amido, aminoxy, alkoxy, and alkenyloxy groups as is well known in the art. When the composition is intended for application to electric and electronic parts, useful groups are alkoxy, acyloxy, alkenyloxy and alkoxyalkenyloxy groups directly attached to a silicon atom.

Examples of the silane include methyltrimethoxysilane, vinyltrimethoxysilane, phenyltrimethoxysilane, vinyltriethoxysilane, tetraethoxysilane, tetra(n-propoxy)silane, methyltris(propenoxy)silane, vinyltris(propenoxy)silane, phenyltris(1-methoxy-2-methylpropenoxy)silane, hydrolyzates thereof, and mixtures thereof.

Shown below are examples of the siloxane.

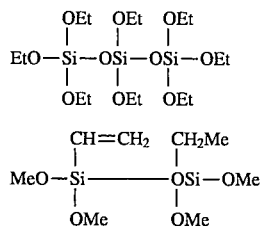

In the formulae, Me is methyl and Et is ethyl.

Preferably the second component, silane or siloxane, is blended in an amount of about 0.5 to about 20 parts, especially about 1 to about 10 parts by weight per 100 parts by weight of the first component, diorganopolysiloxane. Some compositions with less than 0.5 parts of the second component would not cure into an elastomer whereas compositions with more than 20 parts of the second component would cure into a too hard product which is unacceptable as an elastomer.

A third component is a divalent organic tin compound serving as a catalyst. When the tin compound is kept in air as such, its catalysis to promote curing is lost. Blending the tin compound in a form substantially isolated from air ensures that the composition be shelf stable.

Examples of the divalent organic tin compound include tin octylate, tin naphthenate, and tin stearate.

These organic tin compounds can be isolated from air in a substantial sense by any desired means. Typical air barrier means are below.

(1) Air in a package containing the divalent organic tin compound is purged with an inert gas such as nitrogen, argon, and helium.

(2) Like the platinum catalyst described in JP-B 41707/ 1978, the divalent organic tin compound or a carrier having the compound adsorbed thereto is mixed with a silicone resin having a melting point of 40° to 200° C. and the mixture is then finely divided or spray dried to form catalyst particles in which the compound is substantially isolated from air.

More detailedly, a silicone resin is melted under heat. To the melted silicone resin is added and mixed a divalent organic tin compound under an inert atmosphere such as nitrogen atmosphere. After cooling, the solid mixture is pulverized. Alternatively, a silicone resin and a divalent organic tin compound are dissolved into an organic solvent, followed by spray drying to evaporate the organic solvent and recover powders.

(3) Like the platinum catalyst described in JP-A 47442/ 1989, the catalyst is enclosed in a thermoplastic resin by a microcapsulation technique.

When the divalent organic tin compound is substantially isolated from air by barrier means (2) or (3), the present composition can be stored in a single package. If the silicone resin or thermoplastic resin used in barrier means (2) or (3) is a compound soluble in the second component, that is, silane or siloxane having at least three hydrolyzable silyl groups in a molecule, then the present composition is readily curable at lower temperatures. Examples of the silicone resins are those represented by the following formula:

$$R^3_a SiO_{(4-a)/2}$$

wherein $R^3$ is an unsubstituted or substituted monovalent hydrocarbon group as explained in $R^1$ and a is a positive number of 0.8 to 1.8. Preferably, R is methyl group, phenyl group and fluorine-substituted alkyl group such as trifluoropropyl group, $C_8F_{17}CH_2CH_2$, etc. Examples of the thermoplastic resin are those obtained by polymerizing ethylenically unsaturated monomers such as polymers of acrylate, styrene and derivatives thereof.

In the case of microcapsulation, microcapsules preferably have an average diameter of about 0.1 to 50 μm although the capsule diameter is not particularly limited.

Various additives may be blended in the silicone rubber composition of the invention for improving the properties thereof. Exemplary additives are fumed silica and precipitated silica which has been or has not been treated to be hydrophobic, and carbon black as reinforcing fillers, anti-settling agents or agents for improving electric conductivity; ground quartz, fused quartz, spherical silica, diatomaceous earth, zeolite, calcium carbonate, titanium dioxide, iron oxide, alumina, spherical alumina, aluminum hydroxide, aluminum nitride, and magnesium sulfate as semi-reinforcing fillers, extenders or heat conducting fillers; and lead compounds such as lead, lead carbonate and lead hydroxide as radiation barriers. Also there may be blended various carbon functional silanes used for the purpose of imparting tackiness to condensation type silicone rubber compositions, for example, such as amino group-containing alkoxysilanes, epoxy group-containing alkoxysilanes, and mercapto group-containing alkoxysilanes. Further coloring agents such as inorganic pigments and organic dyes, heat resistance enhancers such as cerium oxide, zinc carbonate, manganese carbonate, benzotriazole, and platinum compounds, and flame retardancy enhancers may also be added insofar as the objects of the invention are not impaired.

The silicone rubber composition of the invention can be stored stable in a single package containing all the components. Alternatively, the second components (silane or siloxane) and the third component (organic tin compound) are stored in two separate packages. One package contains the second component and another package contains the third component. The first component (diorganopolysiloxane) and other optional components may be admitted into both or either of the packages. Such divided blending may be suitably selected.

The composition of the invention is cured by mixing all the necessary components, optionally molding the mixture, and heating the molding whereby the molding is cured to the deep inside to form a silicone rubber elastomer. In general, brief cure is obtained by heating at a temperature of about 40° to 200° C., especially about 60° to 150° C. Temperature lower than 40° C. would be too low to provide a quick cure rate whereas temperatures higher than 200° C. would cause deterioration of the silicone rubber itself. The heating time may be about 1 to 60 minutes.

EXAMPLE

Examples of the present invention are given below by way of illustration and not by way of limitation. All parts are by weight.

Reference Example 1

In a glass container, 100 grams of a silicone resin obtained by hydrolysis of 70 mol % of phenyltrichlorosilane, 25 mol % of methyltrichlorosilane, and 5 mol % of diphenyldichlorosilane and having a softening point of 80° C. was dissolved in 500 grams of dichloromethane. With the solution was mixed 5 grams of tin octylate in a nitrogen atmosphere. This solution was atomized through a spray dryer which had been internally purged with nitrogen gas and had an inlet temperature of 90° C. and an outlet temperature of 40° C., obtaining 70 grams of fine particles of the organic tin compound having an average particle diameter of 20 μm.

Reference Example 2

In 500 grams of dichloromethane was dissolved 100 grams of the same silicone resin having a softening point of 80° C. as used in Reference Example 1. With the solution was mixed 5 grams of dibutyltin dilaurate in a nitrogen atmosphere. As in Reference Example 1, the solution was atomized through a spray dryer, obtaining 68 grams of fine particles of the organic tin compound having an average particle diameter of 20 μm.

Reference Example 3

In 500 grams of dichloromethane was dissolved 100 grams of polystyrene having a softening point of 80° C. With the solution was mixed 5 grams of tin octylate in a nitrogen atmosphere. As in Reference Example 1, the solution was atomized through a spray dryer, obtaining 70 grams of fine particles of the organic tin compound having an average particle diameter of 20 μm. The particles were washed with water and dried at 40° C. in a vacuum of 10 mmHg.

EXAMPLES 1–5 & COMPARATIVE EXAMPLES 1–3

Silicone rubber composition 1:
 To 100 parts of a dimethylpolysiloxane end-blocked with a silanol group and having a viscosity of 5,000 centipoise at 25° C. were added 2 parts of octaethoxytrisiloxane and 3 parts of the organic tin compound particles obtained in Reference Example 1. Thorough mixing gave a silicone rubber composition 1. The particles were finely dispersed in the mixture.

Silicone rubber composition 2:
 This is a comparative example.
 A silicone rubber composition 2 was prepared by the same procedure as composition 1 except that 0.15 parts of tin octylate was added instead of the organic tin compound particles obtained in Reference Example 1. The mixture was uniform.

Silicone rubber composition 3:
 To 100 parts of a dimethylpolysiloxane end-blocked with a silanol group and having a viscosity of 5,000 centipoise at 25° C. were added 2 parts of octaethoxytrisiloxane, 50 parts of heavy calcium carbonate, and 3 parts of the organic tin compound particles obtained in Reference Example 1. Thorough mixing gave a uniform silicone rubber composition 3. It was an apparently uniform white viscous mixture.

Silicone rubber composition 4:
 To 100 parts of a dimethylpolysiloxane end-blocked with a silanol group and having a viscosity of 5,000 centipoise at 25° C. was added 4 parts of octaethoxytrisiloxane. This mixture was placed in a package (A). To 100 parts of a dimethylpolysiloxane end-blocked with a silanol group and having a viscosity of 5,000 centipoise at 25° C. was added 6 parts of the organic tin compound particles obtained in Reference Example 1. This mixture was placed in a package (B). A set of packages (A) and (B) gave a silicone rubber composition 4. On use, the contents of packages (A) and (B) were mixed in a weight ratio of 100:100.

Silicone rubber composition 5:
 To 100 parts of a dimethylpolysiloxane end-blocked with a silanol group and having a viscosity of 5,000 centipoise at 25° C. were added 2 parts of octaethoxytrisiloxane, 50 parts of heavy calcium carbonate, and 3 parts of the organic tin compound particles obtained in Reference Example 3. Thorough mixing gave a uniform silicone rubber composition 5. It was an apparently uniform white viscous mixture.

Silicone rubber composition 6:
 A dimethylpolysiloxane end-blocked with a silanol group and having a viscosity of 5,000 centipoise at 25° C., 100 parts, was placed in a package (A). A mixture of 2 parts of octaethoxytrisiloxane and 0.15 parts of tin octylate was placed in a package (B). A set of packages (A) and (B) gave a silicone rubber composition 6. On use, the contents of packages (A) and (B) were mixed in a weight ratio of 100:2.

This composition was designated composition 6-1 when package (B) was allowed to stand in air and composition 6-2 when package (B) was stored in nitrogen in a sealed glass bottle.

Silicone rubber composition 7:
 This is a comparative example.
 To 100 parts of a dimethylpolysiloxane end-blocked with a silanol group and having a viscosity of 5,000 centipoise at 25° C. were added 2 parts of octaethoxytrisiloxane, 50 parts of heavy calcium carbonate, and 3 parts of the organic tin compound particles obtained in Reference Example 2. Thorough mixing gave a uniform silicone rubber composition 7. It was an apparently uniform white viscous mixture.

Each of the composition was cast into an aluminum dish having a diameter of 6 cm and a depth of 1 cm and heated at 100° C. for 30 minutes into a cured product, which was measured for hardness (JIS A scale). Similar measurement was done after the compositions were aged at room temperature for 3 days. The results are shown in Table 1.

TABLE 1

| Composition No. | E1 1 | CE1 2 | E2 3 | E3 4 | E4 5 | CE2 6-1 | E5 6-2 | CE3 7 |
|---|---|---|---|---|---|---|---|---|
| Hardness, fresh | 16 | 16 | 48 | 15 | 10 | 18 | 18 | un-cured |
| Hardness, aged | 16 | —* | 45 | 14 | 8 | un-cured | 15 | un-cured |

*Silicone rubber composition 2 cured in 3 hours after preparation, and the aging test could not be carried out.

As is evident from Table 1, silicone rubber compositions having blended therein the divalent organic tin compound in a form substantially isolated from air quickly cured by heating, forming silicone rubber elastomers having excellent rubbery properties. The compositions remained unchanged even after storage.

There has been described a silicone rubber composition which upon heating, quickly cures to the deep inside without cure inhibition. It forms a silicone rubber elastomer which will find a variety of applications because of excellent rubbery properties.

Japanese Patent Application No. 5-120786 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

I claim:

1. A silicone rubber composition comprising
   (1) a diorganopolysiloxane blocked with a hydroxysilyl group at either end,
   (2) a silane or siloxane having at least three hydrolyzable silyl groups in the molecule, and
   (3) a divalent organic tin compound in a form substantially isolated from air by including the tin compound in a silicone resin represented by the following formula:

$$R^3{}_a SiO_{(4-a)/2}$$

wherein $R^3$ is an unsubstituted or substituted monovalent hydrocarbon group and a is a positive number of 0.8 to 1.8.

2. The composition of claim 1 wherein the divalent organic tin compound is selected from the group consisting of tin octylate, tin naphthenate and tin stearate.

3. The composition of claim 1 wherein the silane or siloxane having at least three hydrolyzable silyl groups in the molecule are present in an amount of 0.5 to 20 parts by weight per 100 parts by weight of the diorganopolysiloxane blocked with a hydroxysilyl group at either end.

4. The composition of claim 1 wherein the diorganopolysiloxane is represented by the formula $$HO(\underset{\underset{R}{|}}{\overset{\overset{R}{|}}{Si}}O)_n H$$

wherein R is a substituted or unsubstituted monovalent hydrocarbon group having 1 to 10 carbon atoms and optionally having a hydroxysilyl substituent, and n is an integer from 100 to 1000.

5. The composition of claim 1 wherein the silane or siloxane is represented by the formula $$R^1{}_a R^2{}_b SiO_{(4-a-b)/2}$$

wherein $R^1$ is an unsubstituted monovalent hydrocarbon group having 1 to 10 carbon atoms, or a substituted monovalent hydrocarbon group having 1 to 10 carbon atoms in which some or all of the hydrogen atoms are replaced by a halogen atom or a cyano group, $R^2$ is a hydrolyzable functional group, and $0.1 < a \leq 4$ and $2 < a+b \leq 4$.

6. The composition of claim 1 wherein the silane is selected from the group consisting of methyltrimethoxysilane, vinyltrimethoxysilane, phenyltrimethoxysilane, vinyltriethoxysilane, tetraethoxysilane, tetra(n-propoxy)silane, methyltris(propenoxy)silane, vinyltris(propenoxy)silane, phenyltris(1-methoxy-2-methylpropenoxy)silane, hydrolyzates thereof, and mixtures thereof.

7. The composition of claim 1 wherein the siloxane is

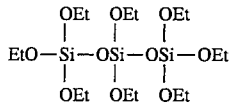

or

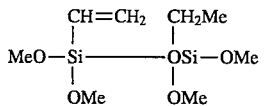

wherein Me is methyl and Et is ethyl.

8. The composition of claim 1 wherein $R^3$ is an unsubstituted monovalent hydrocarbon group having 1 to 10 carbon atoms or a monovalent hydrocarbon group having 1 to 10 carbon atoms in which some or all of the hydrocarbon atoms are replaced by a halogen atom or a cyano group.

* * * * *